(12) United States Patent
Kim et al.

(10) Patent No.: US 12,115,554 B2
(45) Date of Patent: Oct. 15, 2024

(54) SLOT DIE COATING DEVICE HAVING AIR VENT

(71) Applicant: LG Energy Solution, Ltd., Seoul (KR)

(72) Inventors: Ki Tae Kim, Daejeon (KR); Taek Soo Lee, Daejeon (KR); Do Hyun Lee, Daejeon (KR); Cheolwoo Kim, Daejeon (KR); Sang Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 371 days.

(21) Appl. No.: 17/419,832

(22) PCT Filed: Aug. 27, 2020

(86) PCT No.: PCT/KR2020/011446
§ 371 (c)(1),
(2) Date: Jun. 30, 2021

(87) PCT Pub. No.: WO2021/045442
PCT Pub. Date: Mar. 11, 2021

(65) Prior Publication Data
US 2022/0080451 A1 Mar. 17, 2022

(30) Foreign Application Priority Data
Sep. 6, 2019 (KR) .................. 10-2019-0110996

(51) Int. Cl.
*B05C 5/02* (2006.01)
*B05C 11/00* (2006.01)
*H01M 4/04* (2006.01)

(52) U.S. Cl.
CPC ............ *B05C 5/0254* (2013.01); *B05C 11/00* (2013.01); *H01M 4/0404* (2013.01); *H01M 4/0409* (2013.01)

(58) Field of Classification Search
CPC ..... B05C 5/0254; B05C 5/0258; B05C 11/00; H01M 4/0404
See application file for complete search history.

(56) References Cited

U.S. PATENT DOCUMENTS 5,097,792 A * 3/1992 Umemura ............. B05C 5/0254
118/325
5,167,713 A * 12/1992 Watanabe ............. B05C 5/0254
118/411
(Continued)

FOREIGN PATENT DOCUMENTS

| CN | 101489688 A | 7/2009 |
| CN | 107112496 A | 8/2017 |

(Continued)

OTHER PUBLICATIONS

Search Report dated May 26, 2022 from Office Action for Chinese Application No. 202080022513.6 dated Jun. 6, 2022. 3 pgs.
(Continued)

*Primary Examiner* — Karl Kurple
(74) *Attorney, Agent, or Firm* — Lerner David LLP

(57) ABSTRACT

The present disclosure relates to a slot die coating apparatus for coating an electrode active material slurry onto an electrode collector, the slot die coating apparatus including: a coating roller; at least two or more dies; a discharge opening through which the electrode active material slurry is discharged in an opposite direction on which gravity acts; and an air vent installed in the die.

12 Claims, 3 Drawing Sheets

(56) References Cited

U.S. PATENT DOCUMENTS

| | | | |
|---|---|---|---|
| 5,425,967 A | 6/1995 | Tomaru | |
| 5,464,577 A * | 11/1995 | Leonard | B29C 48/313 425/141 |
| 5,834,052 A * | 11/1998 | Fukumura | H01M 4/0402 427/420 |
| 5,853,482 A | 12/1998 | Gartmann et al. | |
| 6,410,094 B2 * | 6/2002 | Mandai | G03C 1/74 118/410 |
| 7,621,737 B2 | 11/2009 | Ciliske et al. | |
| 8,267,039 B2 | 9/2012 | Ishizu et al. | |
| 9,162,246 B2 | 10/2015 | Nagata et al. | |
| 9,391,312 B2 | 7/2016 | Huth et al. | |
| 2002/0023584 A1 * | 2/2002 | Mandai | G11B 5/848 118/123 |
| 2003/0087038 A1 * | 5/2003 | Su | B05C 5/0254 118/200 |
| 2004/0131781 A1 * | 7/2004 | Mandai | B05C 5/0254 118/200 |
| 2005/0037145 A1 * | 2/2005 | Kawabe | B05C 5/001 427/299 |
| 2005/0074555 A1 * | 4/2005 | Kawabe | B05C 5/008 427/355 |
| 2006/0019042 A1 * | 1/2006 | Nojima | B41M 5/52 428/32.24 |
| 2006/0147635 A1 * | 7/2006 | Kawabe | B05C 5/007 427/314 |
| 2008/0018009 A1 * | 1/2008 | Ciliske | B05C 5/001 427/299 |
| 2018/0345310 A1 | 12/2018 | Watanabe et al. | |
| 2019/0081317 A1 | 3/2019 | Keil et al. | |
| 2019/0351446 A1 | 11/2019 | Lee et al. | |
| 2022/0134378 A1 * | 5/2022 | Kim | H01M 4/0409 118/315 |
| 2023/0219112 A1 * | 7/2023 | Lee | B05C 5/0262 118/125 |

FOREIGN PATENT DOCUMENTS

| | | |
|---|---|---|
| CN | 206935691 U | 1/2018 |
| CN | 111295550 A | 6/2020 |
| DE | 19530516 A1 | 2/1997 |
| JP | H02214569 A | 8/1990 |
| JP | H09276771 A | 10/1997 |
| JP | 2003112101 A | 4/2003 |
| JP | 2005144376 A | 6/2005 |
| JP | 2015026471 A | 2/2015 |
| KR | 20100088710 A | 8/2010 |
| KR | 20140061259 A | 5/2014 |
| KR | 20190019827 A | 2/2019 |

OTHER PUBLICATIONS

International Search Report for Application No. PCT/KR2020/011446 dated Nov. 30, 2020, pp. 1-2.

Extended European Search Report and European Search Opinion for corresponding European Patent Application No. 20860479.3 dated Feb. 16, 2022, 8 pgs.

* cited by examiner

[FIG. 3]
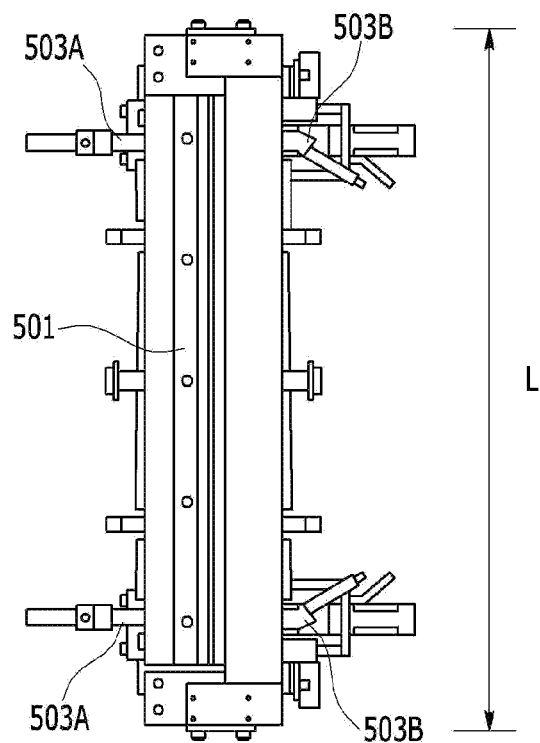

SLOT DIE COATING DEVICE HAVING AIR VENT

CROSS-REFERENCE TO RELATED APPLICATIONS

The present application is a national phase entry under 35 U.S.C. § 371 of International Application No. PCT/KR2020/011446, filed on Aug. 27, 2020, which claims priority to Korean Patent Application No. 10-2019-0110996 filed on Sep. 6, 2019, the disclosures of which are incorporated herein by reference in their entirety.

TECHNICAL FIELD

The present disclosure relates to a slot die coating device including an air vent.

BACKGROUND ART

Recently, as energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, as technology development and demands for mobile devices and battery vehicles increase, the demand for batteries as energy sources is rapidly increasing. Accordingly, much research on batteries capable of meeting various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

A secondary battery includes an electrode assembly having a structure, in which a positive electrode, a negative electrode, and a separator interposed between the positive electrode and the negative electrode are stacked, and these electrode assemblies are mounted in a pouch case, a cylindrical shape can, a prismatic case, and the like depending on the purpose of use to thereby produce a battery.

The positive electrode and the negative electrode are produced by coating a positive electrode slurry and a negative electrode slurry onto an electrode collector formed of aluminum foil and copper foil, and drying them. In order to make the charge and discharge characteristics of the secondary battery uniform, a positive electrode slurry and a negative electrode slurry have to be uniformly coated on the collector, and for this purpose, a slot die coating process is commonly performed.

FIG. 1 is a vertical cross-sectional view illustrating a conventional slot die coating apparatus.

Referring to FIG. 1, the slot die coating apparatus 10 includes a slot die 11, from which the electrode active material slurry is discharged, and a coating roller 12. The slot die 11 includes two die blocks 11a and 12a, and a discharge opening 13, from which the electrode active material slurry (not shown) is discharged in the opposite direction on which gravity acts, is formed between a first die block 11a and a second die block 11b. The electrode active material slurry discharged from the discharge opening 13 is coated onto one surface of the collector 30 while the coating roller 12 rotates.

When bubbles are present in the electrode active material slurry at the time of performing coating using the slot die coating apparatus 10, the bubbles burst while being discharged from the discharge opening 13 in a section in which an uncoated area (not shown) is formed. At this time, a contamination phenomenon occurs in which the electrode active material slurry surrounding the bubbles is partially coated onto the uncoated area like a mottle. Further, since the electrode active material slurry that has burst while being discharged contaminates the die blocks 11a and 11b, the electrode active material slurry receiving troughs 14a and 14b must be formed on the die blocks 11a and 11b.

In the process of coating the electrode active material, since a distance between the discharge opening 13 and the current collector 30 is generally formed as a distance d of 100 to 200 micrometers, the above-mentioned contamination phenomenon is also occurred by fine bubbles.

Therefore, there is an urgent need to develop a slot die apparatus having an improved structure that can solve the above-mentioned problems.

DETAILED DESCRIPTION OF THE INVENTION

Technical Problem

It is an object of the present disclosure to provide a slot die coating apparatus that can prevent an uncoated area and a slot die from being contaminated by an electrode active material slurry in a process of coating an electrode active material.

However, the problem to be solved by the embodiments of the present disclosure is not limited to the above-described problems, and can be variously expanded within the scope of the technical idea included in the present disclosure.

Technical Solution

A slot die coating apparatus according to an embodiment of the present disclosure is a slot die coating apparatus for coating an electrode active material slurry onto an electrode collector, the slot die coating apparatus including: a coating roller; at least two or more dies; a discharge opening through which the electrode active material slurry is discharged in an opposite direction on which gravity acts; and an air vent installed in the die.

The die may include a left die and a right die.

The left die may include a first left die and a second left die.

A left discharge opening is formed by a combination of the first left die and the second left die.

A left slurry receiving part may be formed in the first left die.

The left slurry receiving part may be communicated with the left discharge opening.

The air vent may pass through the first left die to be communicated to the left slurry receiving part.

The air vent may be formed at a portion S1 at which the left slurry receiving part and the left discharge opening are connected to each other.

The right die may include a first right die and a second right die.

The right discharge opening may be formed by a combination of the first right die and a second right die.

A right slurry receiving part may be formed in the second right die.

The right slurry receiving part may be communicated with the right discharge opening.

The air vent may pass through the second right die to be communicated to the right slurry receiving part.

The air vent may be formed at a portion S2 at which the right slurry receiving part and the right discharge opening are connected to each other.

The air vent may include a valve.

Advantageous Effects

As described above, as the slot die coating apparatus according to the embodiments of the present disclosure includes an air vent and thereby, has a technical effect of not only being able to effectively remove bubbles contained in the electrode active material slurry, but also being able to prevent contamination of the slot die.

BRIEF DESCRIPTION OF THE DRAWINGS

FIG. 3 is a plan view illustrating a slot die coating apparatus according to one embodiment of the present disclosure.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

Figure 1:
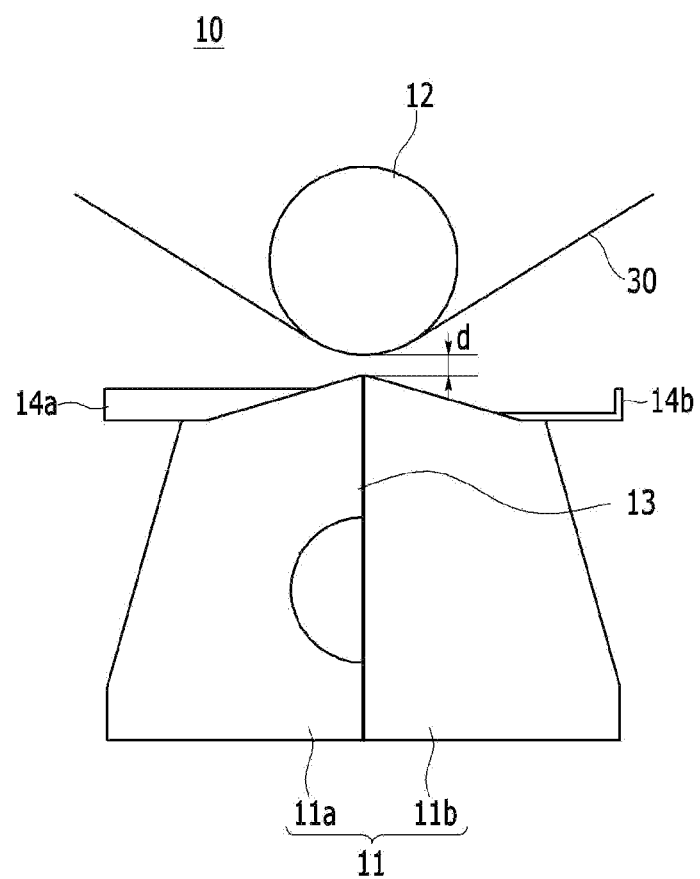
FIG. 1 is a vertical cross-sectional view illustrating a conventional slot die coating apparatus.
Figure 2:
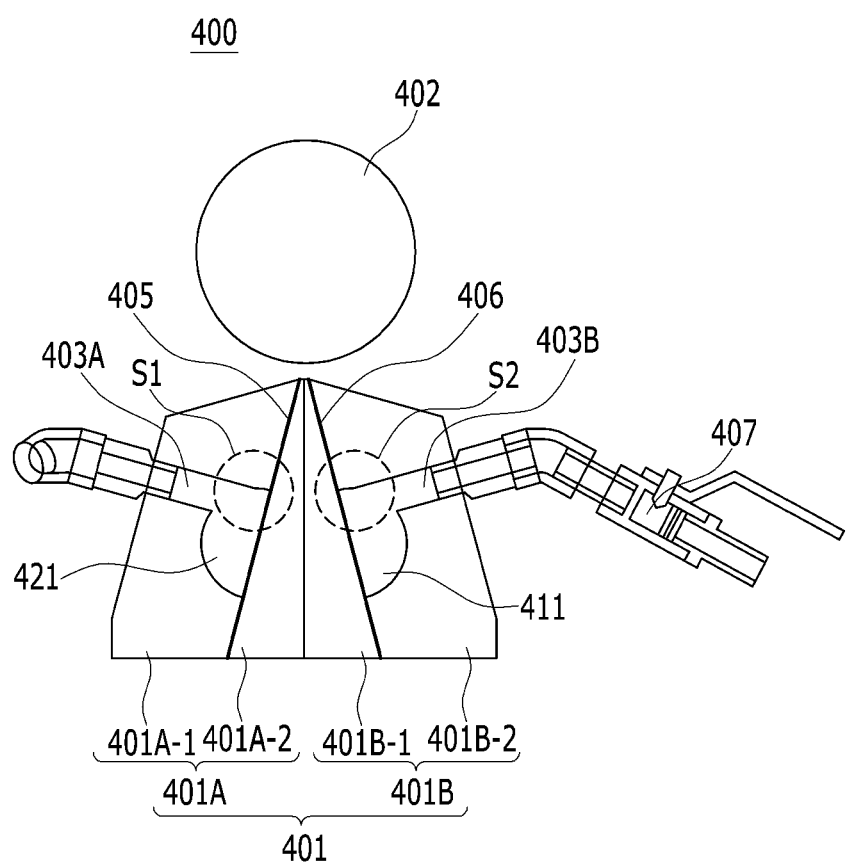
FIG. 2 is a vertical cross-sectional view illustrating a slot die coating apparatus according to one embodiment of the present disclosure.

FIG. 2 is a vertical cross-sectional view illustrating a slot die coating apparatus according to one embodiment of the present disclosure.

Referring to FIG. 2, the slot die coating apparatus 400 may include a slot die 401, a coating roller 402, and air vents 403A and 403B. The slot die coating apparatus 400 may be used in a process of simultaneously coating two electrode active material layers.

The slot die 401 may include a left die 401A and a right die 401B. The left die 401A may include a first left die 401A-1, a second left die 401A-2, and the right die 401B may include a first right die 401B-1 and a second right die 401B-2.

The second left die 401A-2 may have a structure in which a surface facing the first right die 401B-1 is perpendicular to the ground surface.

The second left die 401A-2 may include a groove-shaped left slurry receiving part 421, which has a predetermined depth on a surface facing the first left die 401A-1. The left slurry receiving part 421 can be connected to a left slurry supply chamber (not shown) installed on the outside to continuously receive supply of a first electrode active material slurry. The left slurry receiving part 421 may include a left slurry supply port (not shown) communicated with a left slurry supply chamber (not shown).

When the first electrode active material slurry supplied via the left slurry supply port is fully filled in the left slurry receiving part 421, the first electrode active material slurry moves in a direction, in which the coating roller 402 is installed, through a left discharge opening 405 formed via a sequential combination of the second left die 401A-2 and the first left die 401A-1 to be discharged to the outside. In particular, the first electrode active material slurry is discharged via the left discharge port 405 in the opposite direction on which gravity acts.

The first left die 401A-1 can be located on the left side of the second left die 401A-2 and be combined with the second left die 401A-2 while a left spacer (not shown) being interposed therebetween. A surface of the first upper die 401A-1, which faces the second left die 401A-2, may have an inclined structure with an angle of approximately 30 to 90 degrees with respect to the ground surface.

The first left die 401A-1 and the second left die 401A-2 may be formed of a metal material, and be mutually fastened to each other through bolt coupling and the like.

The right die 401B includes a first right die 401B-1 and a second right die 401B-2. The second right die 401B-2 is located at the right most side of the dies forming the slot die 401, and the surface facing the first right die 401B-1 may have an inclined structure with an angle of approximately 30 to 90 degrees with respect to the ground surface.

The second right die 401B-2 may include a groove-shaped right slurry receiving part 411 having a predetermined depth on a surface facing the first right die 401B-1. The right slurry receiving part 411 can be connected to a right slurry supply chamber (not shown) installed on the outside to continuously receive supply of a second electrode active material slurry. The right slurry receiving part 411 may include a right slurry supply port (not shown) communicated with the right slurry supply chamber. The first electrode active material slurry and the second electrode active material slurry may be identical components or be formed of different components depending on the intended use of the electrode to be produced.

If the second electrode active material slurry supplied via the right slurry supply port is fully filled in the right slurry receiving part 411, the second electrode active material slurry may be discharged to the outside via a right discharge opening 406 formed by a sequential combination of the second right die 401B-2 and the first right die 401B-1. In particular, the second electrode active material slurry is discharged via the right discharge port 406 in the opposite direction on which gravity acts.

The first right die 401B-1 is located on the left side of the second right die 401B-2. The surface facing the first right die 401B-1 and the second right die 401B-2 may have an inclined structure with an angle of approximately 30 to 90 degrees with respect to the ground surface.

The first right die 401B-1 may have a shape in which a surface facing the left die 401A is perpendicular to the ground surface. The first right die 401B-1 and the second right die 401B-2 may be formed of a metal material, and be fastened to each other by bolt coupling or the like.

The air vent may include a left air vent 403A and a right air vent 403B.

The left air vent 403A may pass through the first left die 401A-1 to be communicated to the left slurry receiving part 421. The position of the left air vent 403A is not particularly limited, but since many bubbles are generated in the portion S1 connected from the left slurry receiving part 421 to the left discharge port 405, it is preferable to install the left air vent 403A in the portion S1. Further, in consideration of the inclined structure of the left discharge port 405 and the position of the coating roller 402, it is preferable that the angle formed by the left air vent 403A and the left discharge port 405 is maintained at 30 to 90 degrees. The left air vent 403A may include a valve (not shown) capable of opening and closing.

The right air vent 403B may pass through the second right die 401B-2 to be communicated with the right slurry receiving part 411. The position of the right air vent 403B is not particularly limited. However, since many bubbles are generated in a portion S2 connected from the right slurry receiving part 411 to the right discharge port 406, it is preferable to install the right air vent 403B in the portion S2. Further, in consideration of the inclined structure of the right discharge port 406 and the position of the coating roller 402, it is preferable that the angle formed by the right air vent 403B and the right discharge port 406 is maintained at 30 to 90 degrees. The right air vent 403B may include a valve 407 capable of opening and closing.

In the state where the valve 407 of the right air vent 403B is closed, the second electrode active material slurry may be continuously supplied to the right slurry receiving part 411 via the right slurry supply port. As the second electrode active material slurry is filled in the right slurry receiving part 411, bubbles in the right slurry receiving part 411 and the right discharge port 406 are collected in the right air vent 403B. Bubbles generated in the portion S2 are also collected in the right air vent 403B. Then, the bubbles can be removed at once by opening the valve 407 of the right air vent 403B.

Thus, the operator can efficiently remove the bubbles inside the right slurry receiving part 411 and the right discharge opening 406 without loss of the second electrode active material slurry before starting the coating operation. Further, since the bubbles are removed through the right air vent 403B, there is no need to provide a separate slurry receiving trough.

The left air vent 403A may also remove bubbles in the same manner as the right air vent 403B.

FIG. 3 is a plan view illustrating a slot die coating apparatus according to another embodiment of the present disclosure.

Referring to FIG. 3, the slot die coating apparatus 500 may be located at both sides of the slot die 501 in the longitudinal direction L of the slot die 501, respectively. Further, the right air vent 503B may have a structure bent toward the center of the slot die 501. With this structure, the operator can not only efficiently use the operation space, but also can properly receive the electrode active material slurry containing bubbles.

The installation structure of the air vents 403A and 403B according to the present disclosure is equally applied to a 3-stage slot die coating apparatus in which the second left die 401A-2 and the first right die 401B-1 are formed of one die. In this case, the second left die 401A-2 and the first right die 401B-1 may be the same as the structure of FIG. 2 except for a structure which is formed of one die, and thus, a detailed description thereof will be omitted.

The present disclosure can be variously applied and modified by an ordinary person in the art to which the present disclosure pertains without departing from the scope of the present disclosure, based on the above contents.

The invention claimed is:

1. A slot die coating apparatus for coating an electrode collector with an electrode active material slurry, the slot die coating apparatus comprising:
    a coating roller;
    a slot die comprising two or more dies;
    wherein the slot die comprises a left die (401A) including a left slurry receiving part (421) and a left discharge opening (405), and a right die (401B) including a right slurry receiving part (411) and a right discharge opening (406),
    the left discharge opening (405) configured to discharge the electrode active material slurry in an opposite direction to which gravity acts;
    the right discharge opening (406) configured to discharge the electrode active material slurry in the opposite direction to which gravity acts;
    a left air vent (403A) installed in the left slot die (401A),
    a right air vent (403B) installed in the right slot die (401B),
    wherein the left air vent (403A) is directly connected to a portion (S1) at which the left slurry receiving part (421) and the left discharge opening (405) connect, and
    wherein the right air vent (403B) is directly connected to a portion (S2) at which the right slurry receiving part (411) and the right discharge opening (406) connect.

2. The slot die coating apparatus of claim 1, wherein the left die (401A) comprises a first left die (401A-1) and a second left die (401A-2).

3. The slot die coating apparatus of claim 2, wherein the left discharge opening (405) is formed by a combination of the first left die (401A-1) and the second left die (401A-2).

4. The slot die coating apparatus of claim 3, wherein the left slurry receiving part (421) is formed in the first left die (401A-1).

5. The slot die coating apparatus of claim 4, wherein the left slurry receiving part (421) is communicated with the left discharge opening (405).

6. The slot die coating apparatus of claim 5, wherein the left air vent (403A) passes through the first left die (401A-1) to be communicated to the left slurry receiving part (421).

7. The slot die coating apparatus of claim 1, wherein the right die (401B) comprises a first right die (401B-1) and a second right die (401B-2).

8. The slot die coating apparatus of claim 7, wherein the right discharge opening (406) is formed by a combination of the first right die (401B-1) and a second right die (401B-2).

9. The slot die coating apparatus of claim 8, wherein the right slurry receiving part (411) is formed in the second right die (401B-2).

10. The slot die coating apparatus of claim 9, wherein the right slurry receiving part (411) is communicated with the right discharge opening (406).

11. The slot die coating apparatus of claim 10, wherein the right air vent (403B) passes through the second right die (401B-2) to be communicated to the right slurry receiving part (411).

12. The slot die coating apparatus of claim 1, wherein the right air vent (403B) or the left air vent (403A) comprises a valve.

* * * * *